US009871392B2

(12) United States Patent
Durando et al.

(10) Patent No.: US 9,871,392 B2
(45) Date of Patent: Jan. 16, 2018

(54) PORTABLE BATTERY BOOSTER (75) Inventors: Ronald A. Durando, Little Falls, NJ (US); Fred Allen, Little Falls, NJ (US); Steve Simon, Middletown, NJ (US); Necdet Ergul, Greenwich, CT (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 169 days.

(21) Appl. No.: 12/884,340

(22) Filed: Sep. 17, 2010

(65) Prior Publication Data

US 2012/0068662 A1   Mar. 22, 2012

(51) Int. Cl.
H02J 7/00 (2006.01)
H02J 7/14 (2006.01)
H02J 1/00 (2006.01)

(52) U.S. Cl.
CPC ....... H02J 7/0042 (2013.01); *H02J 2001/006* (2013.01)

(58) Field of Classification Search
CPC .................................................. H02J 7/0034
USPC ....................................................... 320/105
See application file for complete search history.

(56) References Cited

U.S. PATENT DOCUMENTS

| | | |
|---|---|---|
| 3,778,632 A | 12/1973 | Sarbacher |
| 4,079,304 A | 3/1978 | Brandenburg |
| 4,829,223 A | 5/1989 | Broberg et al. |
| 4,925,750 A | 5/1990 | Theiss |
| 4,983,473 A | 1/1991 | Smith |
| 5,194,799 A | 3/1993 | Tomantschger |
| 5,589,292 A | 12/1996 | Rozon |
| 5,793,185 A | 8/1998 | Prelec et al. |
| 5,796,255 A | 8/1998 | McGowan |
| 5,814,972 A | 9/1998 | Shimada et al. |
| 6,130,519 A | 10/2000 | Whiting et al. |

(Continued)

FOREIGN PATENT DOCUMENTS

WO   WO2014142759   9/2014

OTHER PUBLICATIONS http://www.a123systems.com/a123/products; A123 Systems; Watertown, MA; 2010.

(Continued)

*Primary Examiner* — Edward Tso
*Assistant Examiner* — Ahmed Omar
(74) *Attorney, Agent, or Firm* — Michael Stanley Tomsa; McAndrews, Held & Malloy, Ltd.

(57) ABSTRACT

A portable battery booster for providing a compact, light, and energy efficient battery to jump start a vehicle. The portable battery booster generally includes a housing, a battery means adapted to be received by the housing, a pair of cable means, each of the cable means having a proximal end and a distal end, the proximal end electrically connected to the battery means and the distal end detachably connected to a discharged battery of the vehicle. The battery is generally comprised of one or more batteries having the type of primary lithium-metal, rechargeable lithium-ion, and/or lithium-polymer and more specifically preferably comprised of lithium iron phosphate for fast charging, small size, and high performance. The battery may also be connected to one or more supercapacitors, an internal CPU, DC/DC converter, etc. to increase performance. The cable means includes jaws that detachably connect to the housing in a flush and sleek manner.

22 Claims, 5 Drawing Sheets

(56) References Cited

U.S. PATENT DOCUMENTS

| | | |
|---|---|---|
| 6,155,870 A | 12/2000 | Valentine |
| 6,198,249 B1 | 3/2001 | Kroll |
| 6,215,273 B1 * | 4/2001 | Shy ............................... 320/105 |
| 6,265,851 B1 * | 7/2001 | Brien .................... B60L 11/005 |
| | | 320/137 |
| 6,344,733 B1 | 2/2002 | Crass et al. |
| 6,356,050 B1 | 3/2002 | Hussaini |
| 6,377,029 B1 | 4/2002 | Krieger et al. |
| 6,380,712 B2 | 4/2002 | Murphy et al. |
| 6,384,573 B1 | 5/2002 | Dunn |
| 6,679,212 B2 | 1/2004 | Kelling |
| 6,756,764 B2 | 6/2004 | Smith |
| 6,788,025 B2 | 9/2004 | Bertness |
| 6,799,993 B2 | 10/2004 | Krieger et al. |
| 6,819,010 B2 | 11/2004 | Burke |
| 6,871,625 B1 | 3/2005 | Burke |
| 6,988,475 B2 | 1/2006 | Burke |
| 7,015,674 B2 | 3/2006 | VonderHaar |
| 7,161,253 B2 * | 1/2007 | Sodemann et al. ........... 290/1 A |
| 7,301,303 B1 | 11/2007 | Hulden |
| 7,339,347 B2 | 3/2008 | Elder |
| 7,345,450 B2 | 3/2008 | Krieger |
| 7,501,795 B2 | 3/2009 | Bertness et al. |
| 7,528,579 B2 | 5/2009 | Pacholok et al. |
| 7,656,118 B2 | 2/2010 | Krieger et al. |
| 7,808,211 B2 | 10/2010 | Pacholok et al. |
| 7,915,856 B2 | 3/2011 | Krampitz et al. |
| 8,013,567 B2 | 9/2011 | Windsor |
| 8,179,103 B2 | 5/2012 | Doljack |
| 8,610,396 B2 | 12/2013 | Hunter et al. |
| 8,664,912 B2 | 3/2014 | Olsberg |
| 9,263,907 B2 | 2/2016 | Richardson et al. |
| 2002/0041174 A1 | 4/2002 | Prelec et al. |
| 2004/0239290 A1 | 12/2004 | Krieger |
| 2004/0251876 A1 * | 12/2004 | Bertness ................ H02J 7/0054 |
| | | 320/136 |
| 2005/0258797 A1 | 11/2005 | Hung |
| 2006/0092678 A1 * | 5/2006 | Ito ....................... H02M 1/4241 |
| | | 363/125 |
| 2006/0244412 A1 | 11/2006 | Bonzer et al. |
| 2007/0278990 A1 | 12/2007 | Raichle et al. |
| 2007/0285049 A1 | 12/2007 | Krieger |
| 2008/0061733 A1 | 3/2008 | Toya |
| 2008/0157719 A1 * | 7/2008 | Koike ................... H02J 7/0031 |
| | | 320/134 |
| 2008/0246443 A1 | 10/2008 | Doljack |
| 2009/0174362 A1 | 7/2009 | Richardson |
| 2009/0296442 A1 * | 12/2009 | Chang .................. H02J 7/0054 |
| | | 363/142 |
| 2010/0039065 A1 | 2/2010 | Kinkade, Jr. |
| 2010/0301800 A1 | 12/2010 | Inskeep |
| 2010/0315046 A1 | 12/2010 | Trainor et al. |
| 2011/0095728 A1 * | 4/2011 | Chen et al. .................... 320/162 |
| 2011/0100735 A1 | 5/2011 | Flett |
| 2012/0105010 A1 | 5/2012 | Kinoshita |
| 2013/0241498 A1 | 9/2013 | Koebler |

OTHER PUBLICATIONS http://www.omnicel.com/spec/er-18505-hd.pdf; OmniCel; Phoenixville, PA; 2010.

http://www.dowkokam.com/; Dow Kokam; Midland, MI.

* cited by examiner

PORTABLE BATTERY BOOSTER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a battery booster and more specifically it relates to a portable battery booster for efficiently providing a compact, light, and energy efficient battery to jump start a vehicle.

Description of the Related Art

Any discussion of the related art throughout the specification should in no way be considered as an admission that such related art is widely known or forms part of common general knowledge in the field.

Battery boosters have also been around for many years and are generally utilized to provide power to a vehicle battery for starting the vehicle in cases where the vehicle battery is substantially drained. Conventional battery boosters generally lose a charge over time, thus forcing the user to continually purchase new battery boosters, which can be expensive. In addition, conventional battery boosters are generally large, bulky, and heavy. Because of the inherent problems with the related art, there is a need for a new and improved portable battery booster for efficiently providing a compact, light, and energy efficient reserve activated battery to jump start a vehicle.

BRIEF SUMMARY OF THE INVENTION

A system for efficiently providing a compact, light, and energy efficient battery to jump start a vehicle. The invention generally relates to a reserve battery which includes a housing, a battery means adapted to be received by the housing, a pair of cable means, each of the cable means having a proximal end and a distal end, the proximal end electrically connected to the battery means and the distal end detachably connected to a discharged battery of the vehicle. The battery is generally comprised of one or more batteries having the type of primary lithium-metal, rechargeable lithium-ion, and/or lithium-polymer and more specifically preferably comprised of lithium iron phosphate for fast charging, small size, and high performance. The battery may also be connected to one or more supercapacitors, an internal CPU, DC/DC converter, etc. to increase performance. The cable means includes jaws that detachably connect to the housing in a flush and sleek manner.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 5 illustrate a portable battery booster 10, which comprises a housing, a battery cell(s) 41 adapted to be received by the housing 20, a pair of cable means 30, each of the cable means 30 having a proximal end 31 and a distal end 32, the proximal end 31 electrically connected to the battery cells 41 and the distal end 32 detachably connected to a discharged battery of the vehicle (e.g. automobile, boat, recreational vehicle, motorcycle, etc.), the vehicle battery generally being a conventional 12.7 volt battery; however different voltage batteries may be appreciated. The battery pack 40 generally includes one or more cells 41 having the type of primary lithium-metal, rechargeable lithium-ion, and/or lithium-polymer and more specifically preferably comprised of lithium iron phosphate for fast charging, small size, and high performance. The battery pack 40 may also be connected to one or more supercapacitors 60, an internal CPU 50, DC/DC converter 70, etc. to increase performance.

Figure 1:
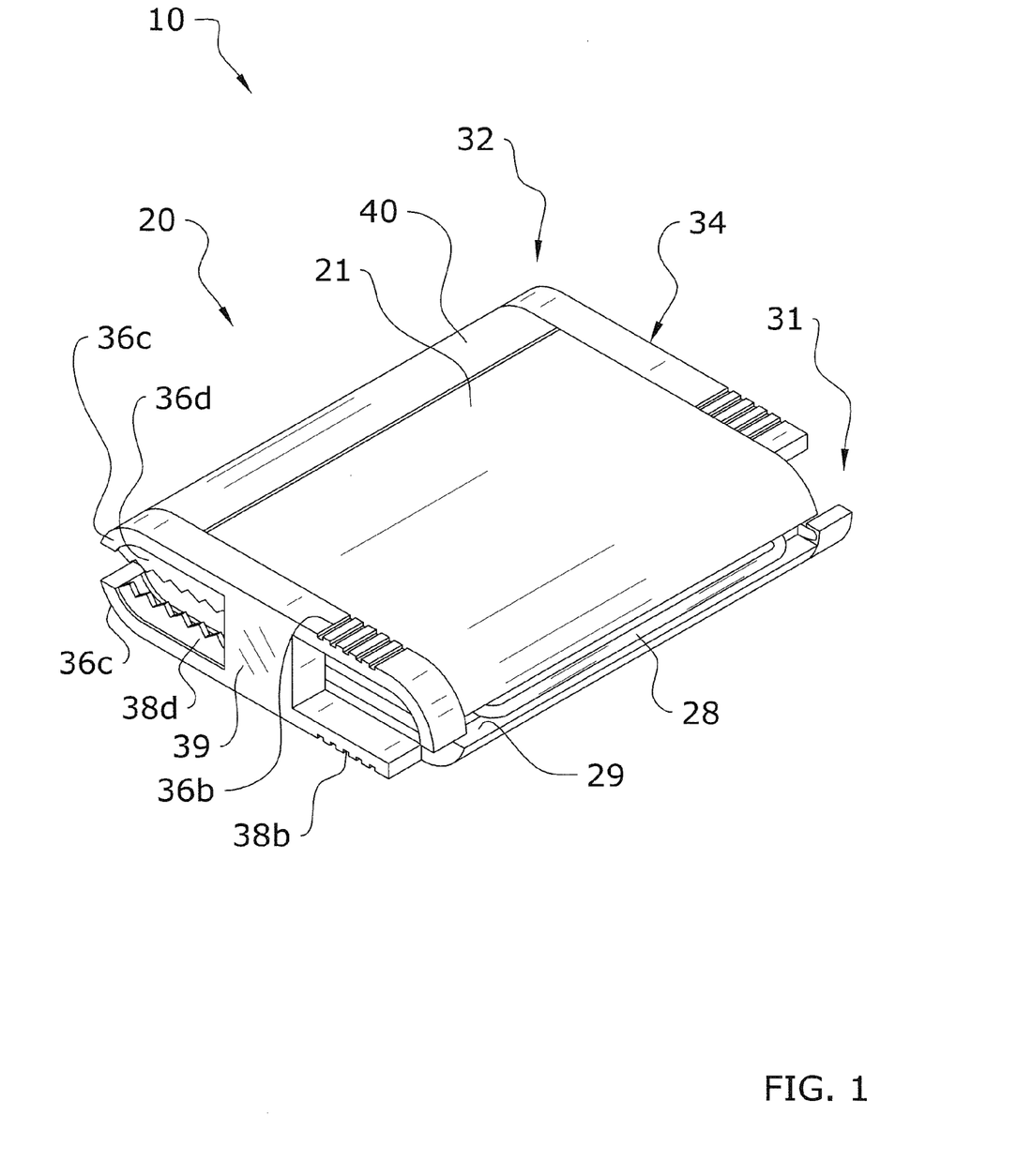
FIG. 1 is an upper perspective view of the present invention with the clamps connected to the housing.
Figure 2:
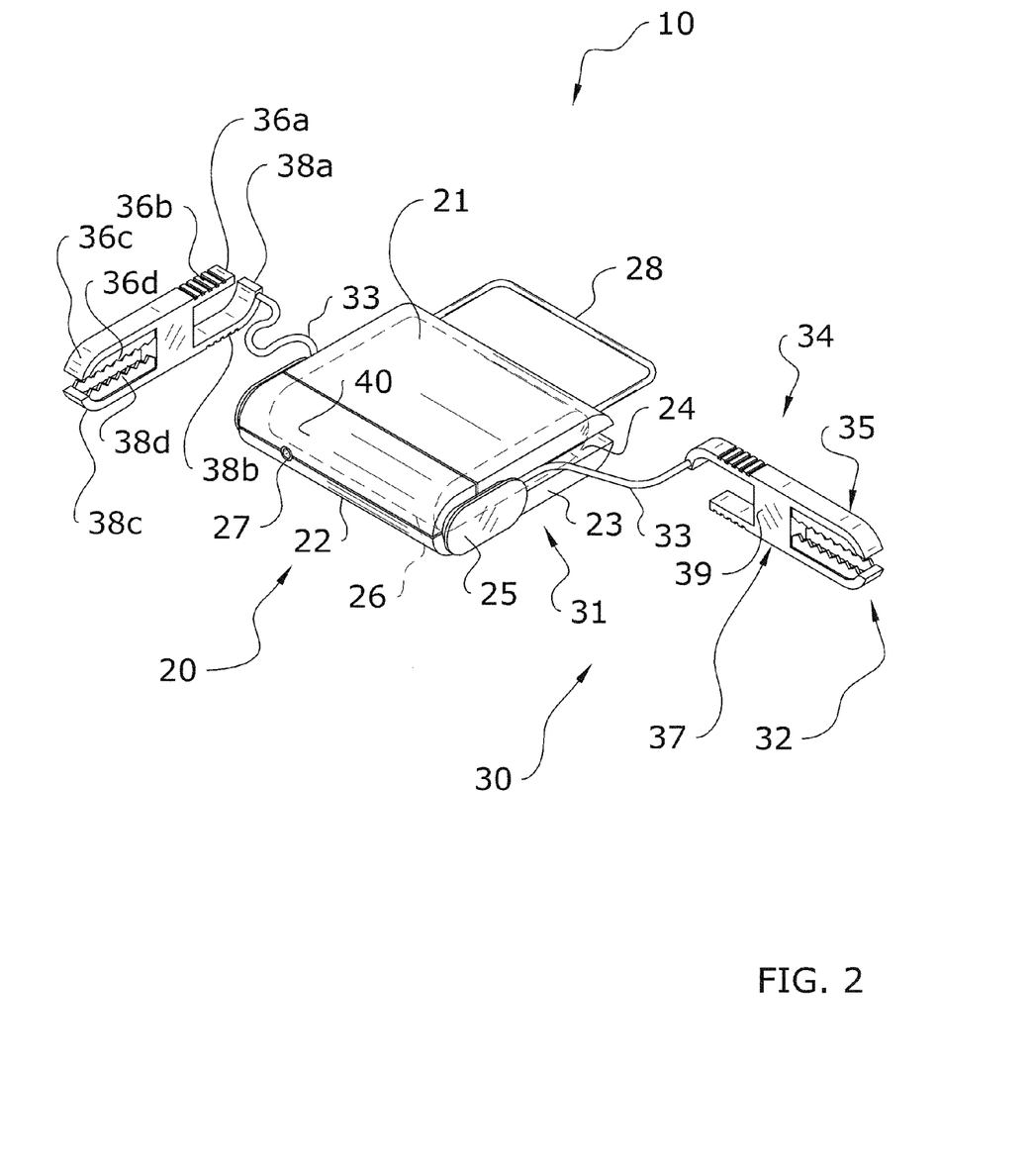
FIG. 2 is an upper perspective view of the present invention with the clamps disconnected to the housing.

FIGS. 1 and 2 illustrate the mechanical structure of the present invention. The housing 20 is generally comprised of an injection molded plastic material being of a generally rectangular shape with rounded corners and having a substantially flat top 21, substantially flat bottom 22, and sides 23. The housing 20 is further generally sleek in structure, thus being relatively thin as compared to conventional booster systems. More particular, in the preferred embodiment, the housing 20 generally has a width of approximately 6 inches, a height of approximately 1.5 inches, and a depth of approximately 4.5 inches. Other sizes may be appreciated all which employ the sleek structure making the housing 20 portable, lightweight, and adaptable to various storage situations.

The housing 20 also generally includes slots 24 along a rear end of opposing sides 23 for receiving the proximal end 31 of the cables 33 (positive and negative cables) and a retaining element 25 spaced laterally from the sides 23 of the forward end of the housing 20 for receiving the jaws 36c, 38c of the clamps 34. The housing 20 may further include a recharge port 27 for charging the battery pack 40, the port 27 being electrically connected to the cells 41 of the battery pack 40. The housing 20 may further employ a pivotal handle 28 for carrying, wherein the handle 28 is received within a slot 29 of the housing 20. The handle 28 may also serve as a stand or support.

The cable means 30 generally includes the cables 31 electrically connected to the battery pack 40 for transferring power and a clamp 33 connected to each cable 33 forming the distal end 32. Generally, a pair of clamps 33 are utilized, one for positive and one for negative (ground). The clamp 34 includes a first section 35 and a second section 37, the first section 35 pivotally connected to the second section 37 near a longitudinal and lateral center pivot point 39 of the clamp 34, each section 35, 37 having an integral jaw 36c, 38c and handle 36a, 38a being comprised of a plastic injection molded structure, and each jaw 36c, 38c having copper clamping teeth 36d, 38d electrically connected to the cable 33 and battery pack 40. The handles 36a, 38a may include gripping means, such as grip indentations 36b, 38b, for more easily maneuvering and operating the clamp 34. The exterior contour of the clamps 34 also generally includes rounded ends to follow the shape of the housing 20. The upper surface of the clamp 34 along the upper section 35 and the lower surface of the clamp 34 along the lower section 37 are generally flat and when the clamp 34 is detachably connected to the retainer element 25 of the housing 20, the upper surface and the lower surface of the clamp 34 is flush and parallel with the upper surface and the lower surface of the housing 20 as illustrated in FIG. 1.

The power supply of the present invention is generally comprised of a battery pack 40 having a plurality of battery cells 41 electrically connected for transferring power to the cables 33 to provide power to the discharged battery of the vehicle. The battery pack 40 is generally detachably connected to the housing 20 within an inner chamber 26. The battery pack 40 may be completely contained within the housing 20 or the inner chamber 26 be comprised of an indentation in the housing 20 and thus the battery pack 40 having exterior walls that integrally follow the exterior shape of the housing 20 and form an exterior surface (i.e. be flush with the exterior of the housing 20). Alternately, a plurality of battery cells 41 may be separately inserted and contained within the housing 20.

The battery cells 41 are generally small in size, thus allowing for the housing 20 to be small in size. Generally, each of the battery cells 41 employs a 26 mm×65 mm size, thus being substantially small so that the housing 20 may maintain a slim profile. The battery cells 41 are generally comprised of a primary lithium-metal type, a rechargeable lithium-ion type, and/or a lithium-polymer type. A preferably type of the battery cell 41 is a lithium iron phosphate ($LiFePO_4$) type thus allowing for fast charging, small in size, and having high performance. In one embodiment, four cells 41 meet the specifications of a DOW-KOKAM cell being SLPB 9543140H5. Other embodiment includes an OMNICEL ER 18505HD lithium thionyl chloride cell and cells manufactured by A123 SYSTEMS, such as A123 ANR26650M1A. In further alternate embodiments, the cells 41 may include rechargeable battery cells combined with primary (non rechargeable) battery cells to enhance the overall performance of the batteries. Alternately, or additionally, the present invention may employ a hybrid system wherein the battery cells 41 may be combined with one or more supercapacitors 60 to store energy and provide quick jolts of power to the discharged battery. Alternately, a reserve battery cell(s) 41 may be utilized, such as a reserve battery that requires manual activation prior to use.

Additionally, the present invention generally employs a heat sink that uses minimal space and is light weight to maintain battery surface temperature that does not exceed 50 degrees Celsius during operation. Additionally, a wiring harness to individually connect each of the battery cells 41 is utilized. Further, an electronic circuit board that uses minimal space and is light weight is used to protect the battery cells 41 by providing features such as detecting a shorted load, preventing electric current from flowing through the terminals and into the lithium ion battery stack, detecting a low lithium ion battery voltage and not allowing discharge and related safety and performance features.

Figure 3:
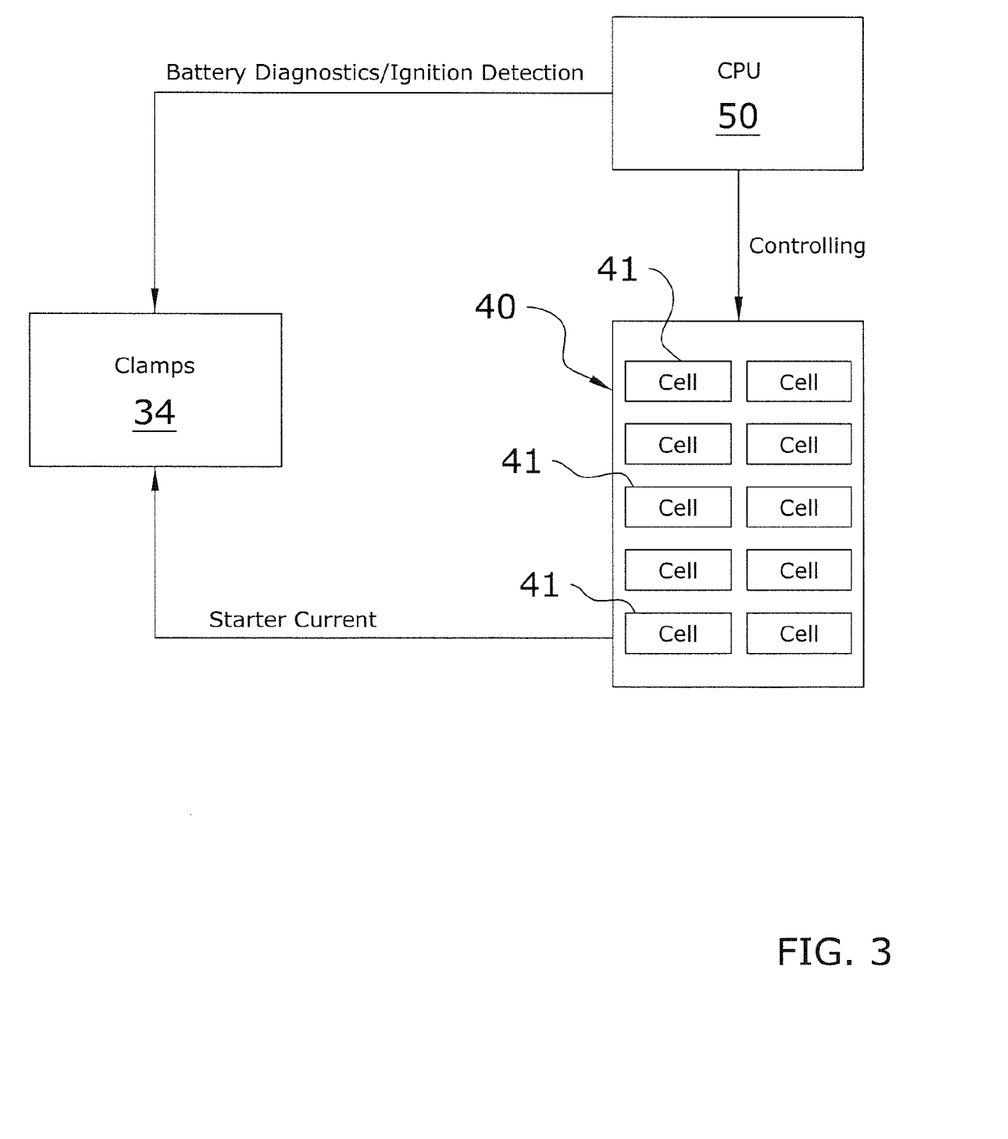
FIG. 3 is an exemplary electrical diagram of a first embodiment of the present invention.
Figure 4:
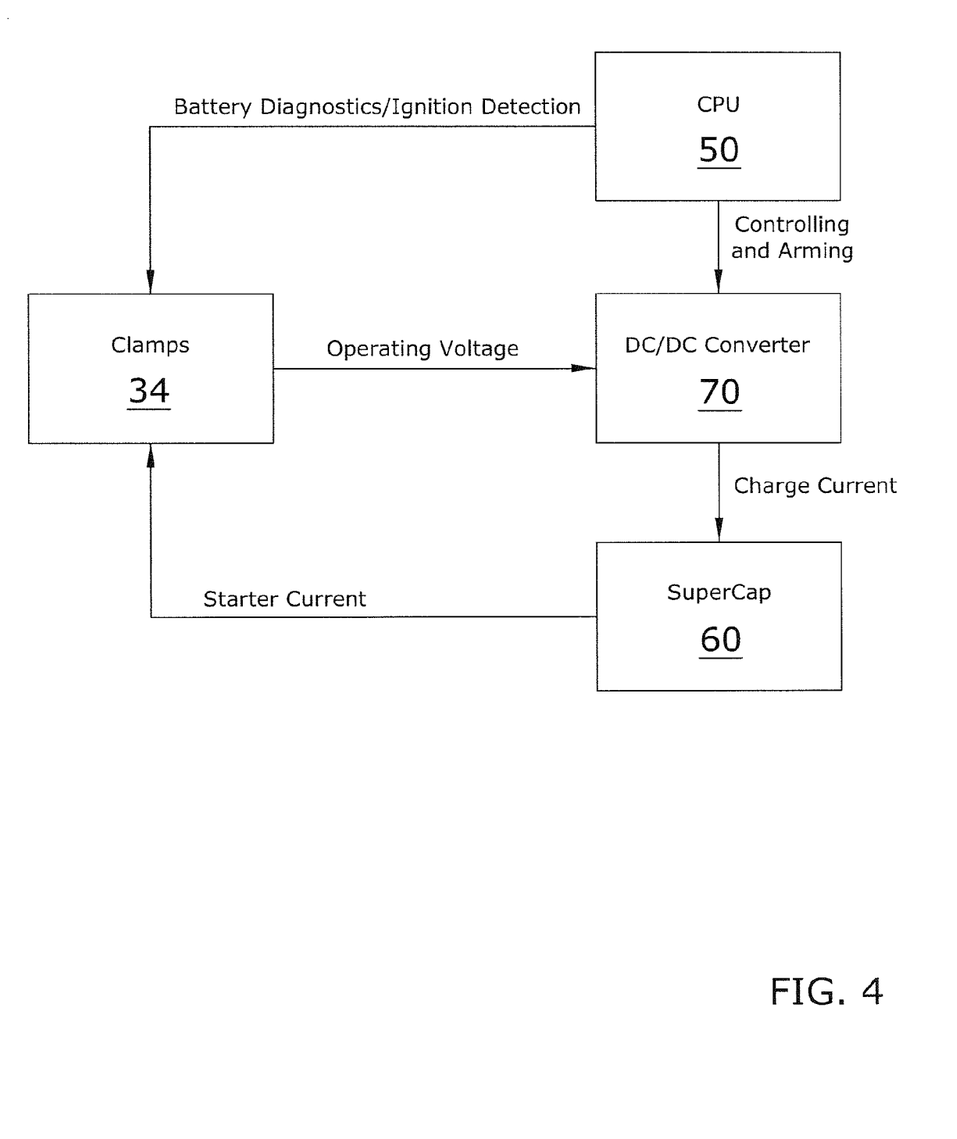
FIG. 4 is an exemplary electrical diagram of a second embodiment of the present invention.
Figure 5:
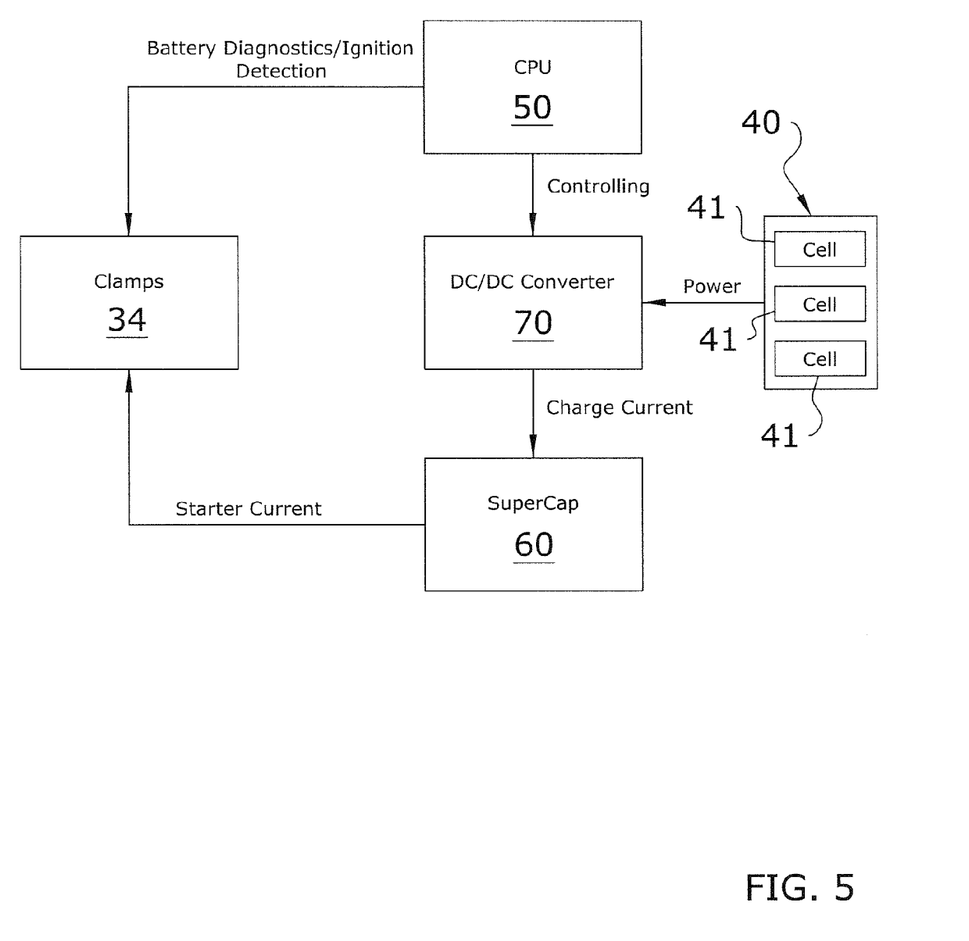
FIG. 5 is an exemplary electrical diagram of a third embodiment of the present invention.

FIGS. 3 through 5 illustrates exemplary embodiments of the present invention. In FIG. 3, a plurality of battery cells 41 are controlled via a central processing unit (CPU 50) located within the housing 20 and the starter current from the battery cells 41 is delivered to the clamps 34 for powering the discharged battery, the battery cells 41 being comprised of a $LiFePO_4$ type. In FIG. 4, a supercapacitor 60 (SuperCap) receives charge current from a DC/DC converter 70 that is controlled via the CPU 50, all within the housing 20. The SuperCap 60 is able to provide a jolt of power to the discharged battery through the clamps 34. A disadvantage to the configuration in FIG. 4 is that the unit must be charged before each usage since the SuperCap 60 has a high leakage current. A hybrid system, as shown in FIG. 5, illustrates a plurality of $LiFePO_4$ battery cells 41 connected to a DC/DC converter 70 which provides charge current to a SuperCap 60 that provides starter current to the discharged battery through the clamps 34.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A handheld battery booster for boosting a motor vehicle having a vehicle battery, the handheld battery booster comprising:
    a handheld housing defining a chamber, wherein the housing is sized for handheld use;
    a lithium battery positioned within said chamber to supply a starter current, wherein said lithium battery is a lithium iron phosphate battery or a lithium-polymer battery;
    a pair of cables to transfer the starter current from said lithium battery to said motor vehicle; and a processor operatively coupled with an ignition detection circuit,
  wherein the ignition detection circuit is configured to detect an ignition condition of said motor vehicle via said pair of cables, and
  wherein the processor is configured to prevent transfer of the starter current from said lithium battery to said vehicle battery until the ignition detection circuit detects the ignition condition.

2. The handheld battery booster of claim 1, wherein the processor is configured to prevent current from flowing from the motor vehicle and into the lithium battery via the pair of cables.

3. The handheld battery booster of claim 1, further comprising a low voltage circuit to detect a low voltage condition for said lithium battery, wherein said processor prohibits power transfer from said lithium battery to said pair of cables when said low voltage circuit detects the low voltage condition.

4. The handheld battery booster of claim 1, further comprising a shorted load circuit to detect a shorted load condition across said pair of cables, wherein said processor prohibits power transfer from said lithium battery to said pair of cables when said shorted load circuit detects the shorted load condition.

5. The handheld battery booster of claim 1, wherein the lithium battery comprises a plurality of battery cells, each of said plurality of battery cells having a nominal voltage between 3 and 4 volts.

6. The handheld battery booster of claim 5, wherein the plurality of battery cells consists of four battery cells.

7. The handheld battery booster of claim 1, further comprising a supercapacitor electrically coupled to said lithium battery, wherein said processor is configured to selectively discharge said supercapacitor to said motor vehicle.

8. The handheld battery booster of claim 1, wherein each of said pair of cables includes a clamp to detachably couple with the motor vehicle, wherein each clamp comprises a plastic injection molded structure and metallic clamping teeth.

9. A portable battery booster for boosting a motor vehicle having a vehicle battery, the portable battery booster comprising:
  a housing defining a chamber, wherein the housing is sized for handheld use;
  a lithium battery positioned within said chamber to provide a starter current to the motor vehicle via a pair of cables;
  an ignition detection circuit to detect an ignition condition of said motor vehicle via said pair of cables; and
  a processor operatively coupled with the ignition detection circuit and configured to selectively control power transfer between said lithium battery and said motor vehicle,
    wherein the processor is configured to prevent (1) transfer of the starter current from said lithium battery to said motor vehicle until the ignition detection circuit detects the ignition condition, and (2) current from flowing from the motor vehicle and into the lithium battery via the pair of cables.

10. The portable battery booster of claim 9, further comprising a low voltage circuit to detect a low voltage condition for said lithium battery, wherein said processor prohibits power transfer from said lithium battery to said pair of cables when said low voltage circuit detects the low voltage condition.

11. The portable battery booster of claim 9, further comprising a shorted load circuit to detect a shorted load condition across said pair of cables, wherein said processor prohibits power transfer from said lithium battery to said pair of cables when said shorted load circuit detects the shorted load condition.

12. The portable battery booster of claim 9, wherein the lithium battery consists of four battery cells.

13. The portable battery booster of claim 12, wherein each of said four battery cells having a nominal voltage between 3 and 4 volts.

14. The portable battery booster of claim 9, further comprising a supercapacitor electrically coupled to said lithium battery, wherein said processor is configured to selectively discharge said supercapacitor to said motor vehicle.

15. The portable battery booster of claim 14, further comprising a DC/DC converter configured to provide a charging current to said supercapacitor using a battery current drawn from the vehicle battery.

16. The portable battery booster of claim 9, wherein each of said pair of cables includes a clamp to detachably couple with the motor vehicle, wherein each clamp comprises a plastic injection molded structure and metallic clamping teeth.

17. A portable battery booster for boosting a motor vehicle having a vehicle battery, the portable battery booster comprising:
  a housing defining a chamber, wherein the housing is sized for handheld use;
  a supercapacitor and a lithium battery positioned within said chamber, wherein the supercapacitor and the lithium battery are each configured to provide a current to the motor vehicle via a pair of cables; and
  an ignition detection circuit to detect an ignition condition of said motor vehicle via said pair of cables, wherein the ignition detection circuit is operatively coupled with a processor, the processor being configured to prevent transfer of the current from said supercapacitor and said lithium battery to said motor vehicle until the ignition detection circuit detects the ignition condition.

18. The portable battery booster of claim 17, wherein the processor is configured to prevent current from flowing from the motor vehicle and into the lithium battery via the pair of cables.

19. The portable battery booster of claim 17, further comprising a DC/DC converter configured to provide a charging current to said supercapacitor using a battery current drawn from the vehicle battery.

20. The portable battery booster of claim 17, further comprising a low voltage circuit to detect a low voltage condition for said lithium battery, wherein said processor prohibits power transfer from said lithium battery to said pair of cables when said low voltage circuit detects the low voltage condition.

21. The portable battery booster of claim 17, further comprising a shorted load circuit to detect a shorted load condition across said pair of cables, wherein said processor prohibits power transfer from said lithium battery to said pair of cables when said shorted load circuit detects the shorted load condition.

22. A portable battery booster for boosting a motor vehicle having a discharged battery, the portable battery booster comprising:
  a housing defining a chamber;
  a lithium battery positioned within said chamber;

a pair of cables, each of said cables having a proximal end and a distal end,
- wherein said proximal end is operably connected to said battery,
- wherein said distal end is configured to detachably connect to the discharged battery, and
- wherein said clamp includes a first section and a second section, said first section pivotally connected to said second section, each said section having an integral jaw and handle, an upper surface of said first section being parallel and flush to an upper surface of said housing when detachably connected to said housing and a lower surface of said second section being parallel and flush to a lower surface of said housing when detachably connected to said housing; and a processor communicatively coupled with an ignition detection circuit,
- wherein the ignition detection circuit is configured to detect an ignition condition of said motor vehicle via said pair of cables, and wherein the processor is configured to prevent transfer of the starter current from said lithium battery to said discharged battery until the ignition detection circuit detects the ignition condition.

* * * * *

UNITED STATES PATENT AND TRADEMARK OFFICE
CERTIFICATE OF CORRECTION

PATENT NO. : 9,871,392 B2  Page 1 of 1
APPLICATION NO. : 12/884340
DATED : January 16, 2018
INVENTOR(S) : Ronald A. Durando et al.

It is certified that error appears in the above-identified patent and that said Letters Patent is hereby corrected as shown below:

In the Claims

In Column 4, Line 61 (Claim 1) replace the instance of "the housing"" with "the handheld housing".

In Column 7, Line 4 (Claim 22) replace the instance of "said battery" with "said lithium battery".

In Column 7, Line 5 (Claim 22) replace the instance of "said distal end is configured" with "said distal end comprises a clamp configured".

In Column 7, Line 22 (Claim 22) replace the instance of "the starter current" with "a starter current".

Signed and Sealed this
First Day of June, 2021

Drew Hirshfeld
*Performing the Functions and Duties of the
Under Secretary of Commerce for Intellectual Property and
Director of the United States Patent and Trademark Office*